US012775184B2

(12) United States Patent
Hata et al.

(10) Patent No.: US 12,775,184 B2
(45) **Date of Patent: *Oct. 27, 2026**

(54) ILLUMINATING UNIT AND DISPLAY APPARATUS

(71) Applicant: SATURN LICENSING LLC, New York, NY (US)

(72) Inventors: Kenji Hata, Kanagawa (JP); Yuji Iwai, Kanagawa (JP); Seiji Hayashimoto, Tokyo (JP); Yuji Nakahata, Tokyo (JP)

(73) Assignee: SATURN LICENSING LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/105,286

(22) Filed: Feb. 3, 2023

(65) Prior Publication Data

US 2023/0251523 A1 Aug. 10, 2023

Related U.S. Application Data

(63) Continuation of application No. 17/872,053, filed on Jul. 25, 2022, now Pat. No. 11,604,381, which is a (Continued)

(51) Int. Cl.
*G02F 1/13357* (2006.01)
*F21S 2/00* (2016.01)
(Continued)

(52) U.S. Cl.
CPC .......... *G02F 1/133602* (2013.01); *F21S 2/00* (2013.01); *G02B 6/0013* (2013.01); (Continued)

(58) Field of Classification Search
CPC ............. F21S 2/00; G02B 6/0013–002; G02B 6/0033–0043; G02B 6/0055–0065; G02F 1/133602; G02F 1/133615; G09G 3/36
See application file for complete search history.

(56) References Cited

U.S. PATENT DOCUMENTS 5,390,436 A 2/1995 Ashall
6,174,064 B1 1/2001 Kalantar et al.
(Continued)

FOREIGN PATENT DOCUMENTS

CN 1517724 8/2004
CN 101749597 6/2010
(Continued)

OTHER PUBLICATIONS

International Search Report corresponding to PCT/JP2016/077090, dated Nov. 22, 2016 (2pgs.).

*Primary Examiner* — Jason M Han
(74) *Attorney, Agent, or Firm* — Richard LaPeruta

(57) ABSTRACT

An illuminating unit includes: a plurality of light sources; a light-guide plate including an end surface disposed to face the plurality of light sources, a first surface that outputs light which is based on incident light from the end surface, and a second surface that faces the first surface and includes a plurality of convex parts; and an optical sheet adhered to side of the second surface of the light-guide plate, with the plurality of convex parts being interposed therebetween. The plurality of convex parts include a plurality of first convex parts disposed in a first region inside the second surface, and one or plurality of second convex parts disposed in at least a portion of a second region on a periphery of the first region inside the second surface.

17 Claims, 14 Drawing Sheets

Related U.S. Application Data continuation of application No. 17/502,738, filed on Oct. 15, 2021, now Pat. No. 11,428,983, which is a continuation of application No. 15/771,534, filed as application No. PCT/JP2016/077090 on Sep. 14, 2016, now abandoned.

(51) Int. Cl.
*F21V 8/00* (2006.01)
*G09G 3/36* (2006.01)

(52) U.S. Cl.
CPC ......... *G02B 6/0035* (2013.01); *G02B 6/0055* (2013.01); *G09G 3/36* (2013.01); *G02B 6/0058* (2013.01); *G02B 6/0061* (2013.01); *G02B 6/0065* (2013.01); *G02F 1/133615* (2013.01)

(56) References Cited

U.S. PATENT DOCUMENTS

| | | | | |
|---|---|---|---|---|
| 6,447,135 | B1 | 9/2002 | Wortman et al. | |
| 6,746,129 | B2 | 6/2004 | Ohkawa | |
| 6,904,225 | B2 * | 6/2005 | Tamura | G02B 6/0036 385/901 |
| 7,366,392 | B2 * | 4/2008 | Honma | G02B 6/0048 385/146 |
| 7,404,659 | B2 | 7/2008 | Mai | |
| 7,768,594 | B2 * | 8/2010 | Kurihara | G02B 6/0025 362/610 |
| 9,441,828 | B2 * | 9/2016 | Wu | F21V 33/0052 |
| 9,885,822 | B2 | 2/2018 | Lin et al. | |
| 2004/0184257 | A1 * | 9/2004 | Huang | G02B 6/0043 362/613 |
| 2004/0193051 | A1 | 9/2004 | Mandrusov et al. | |
| 2007/0040959 | A1 | 2/2007 | Liao | |
| 2008/0285308 | A1 | 11/2008 | Clary et al. | |
| 2008/0310184 | A1 | 12/2008 | Katsumata | |
| 2009/0237593 | A1 | 9/2009 | Hoshi | |
| 2010/0165232 | A1 | 7/2010 | Park et al. | |
| 2012/0013811 | A1 | 1/2012 | Shimizu | |
| 2012/0147627 | A1 | 6/2012 | Pan | |
| 2015/0247964 | A1 * | 9/2015 | Kamada | G02B 6/0061 362/613 |

FOREIGN PATENT DOCUMENTS

| | | |
|---|---|---|
| CN | 102252223 | 11/2011 |
| CN | 102713417 | 10/2012 |
| CN | 103913798 | 7/2014 |
| CN | 104459871 | 3/2015 |
| CN | 104460109 | 3/2015 |
| CN | 204187534 | 3/2015 |
| CN | 104516136 | 4/2015 |
| CN | 104776397 | 7/2015 |
| JP | H0981049 | 3/1997 |
| JP | H10144122 A | 5/1998 |
| JP | 11224519 | 8/1999 |
| JP | H11219611 | 8/1999 |
| JP | 2004193051 | 7/2004 |
| JP | 2013016398 | 1/2013 |
| JP | 2014175057 | 9/2014 |
| KR | 19990023490 | 3/1999 |
| KR | 20010037757 | 5/2001 |
| TW | 201115190 A | 5/2011 |

* cited by examiner

[ FIG. 1 ]
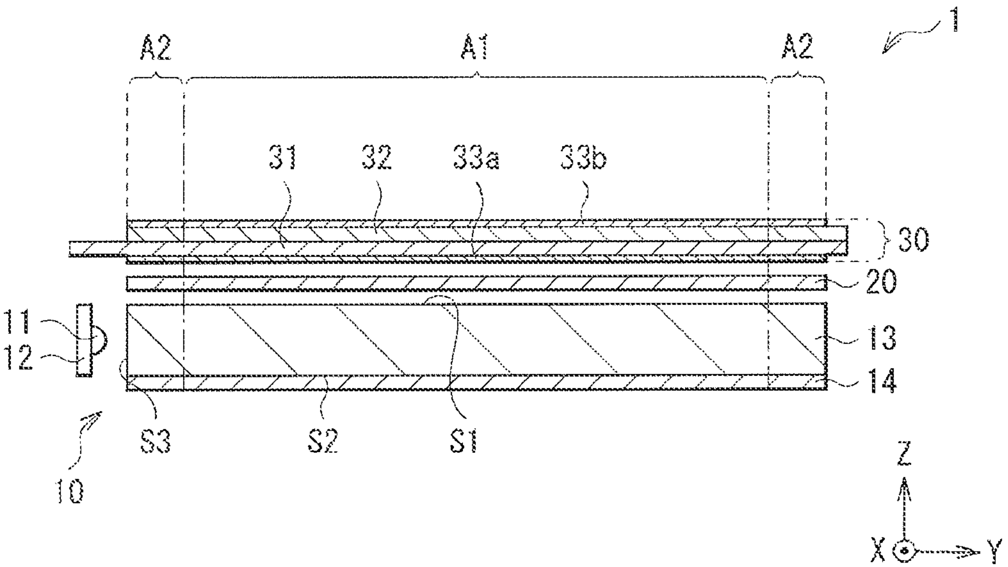

[ FIG. 2 ]
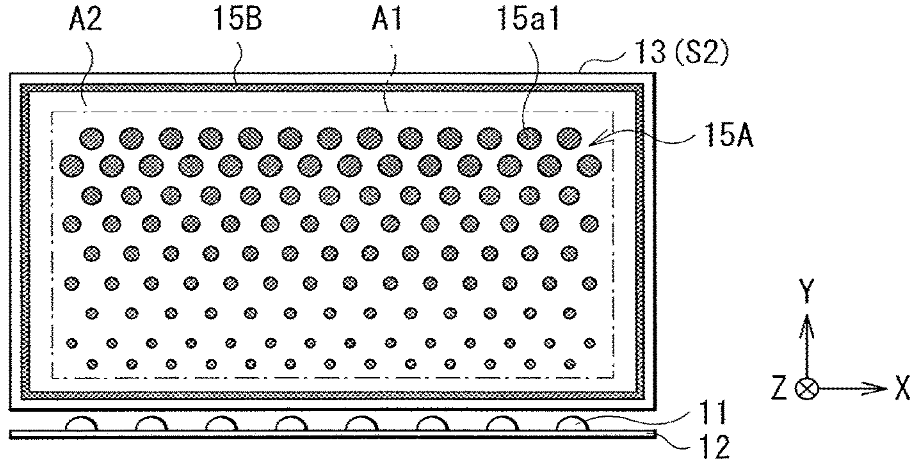
[ FIG. 3 ]
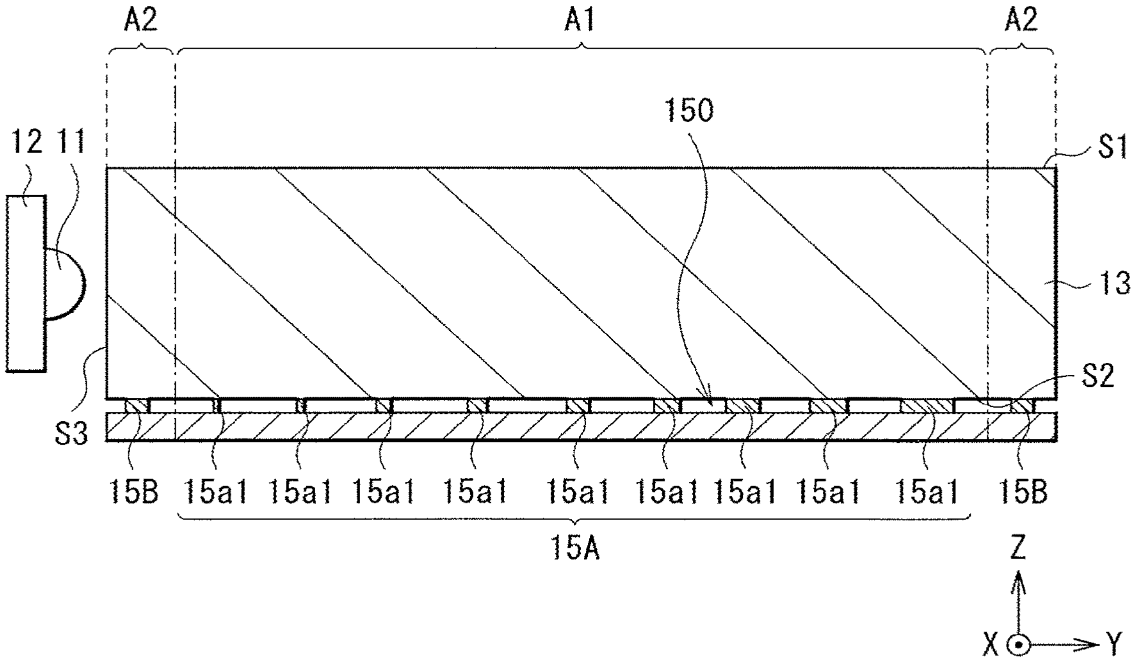

[ FIG. 4A ]
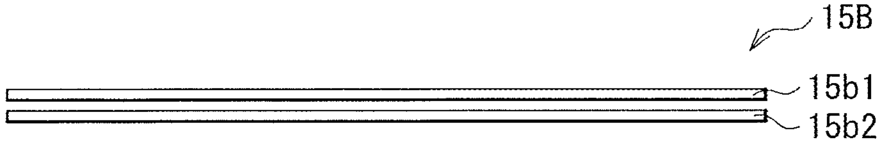
[ FIG. 4B ]
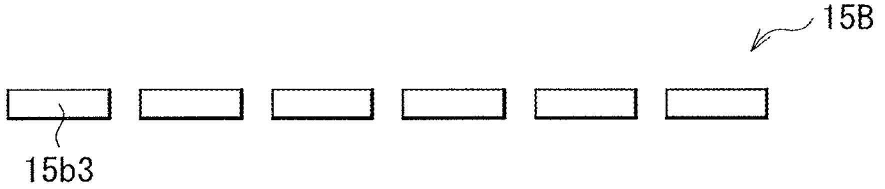
[ FIG. 4C ]

[ FIG. 5 ]
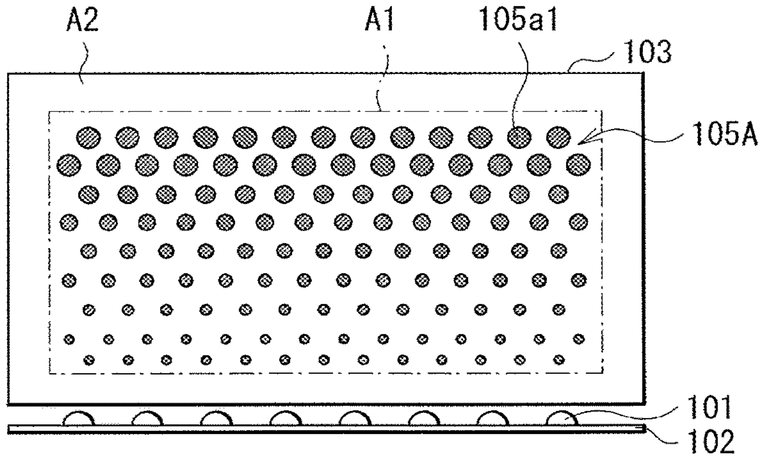
[ FIG. 6 ]
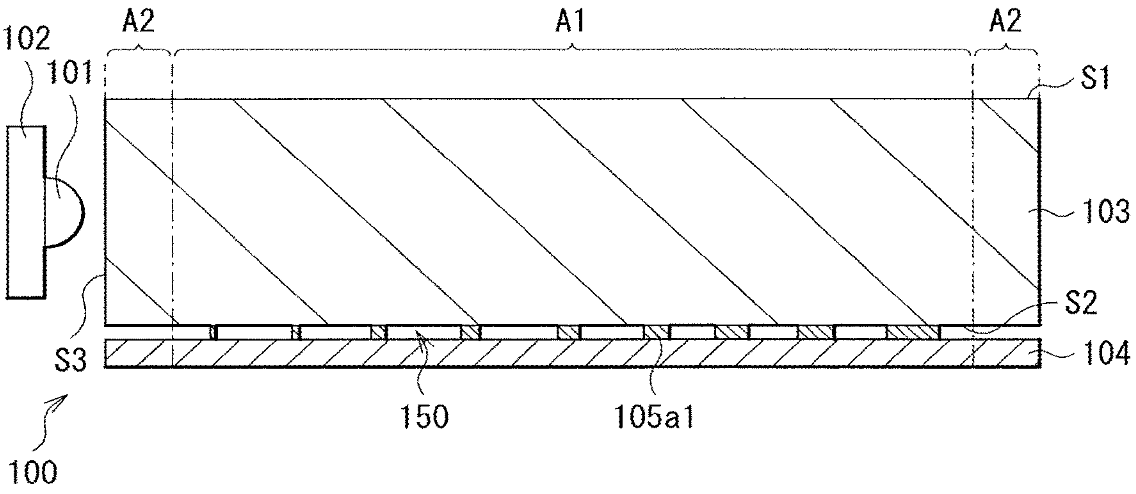

[ FIG. 7 ]
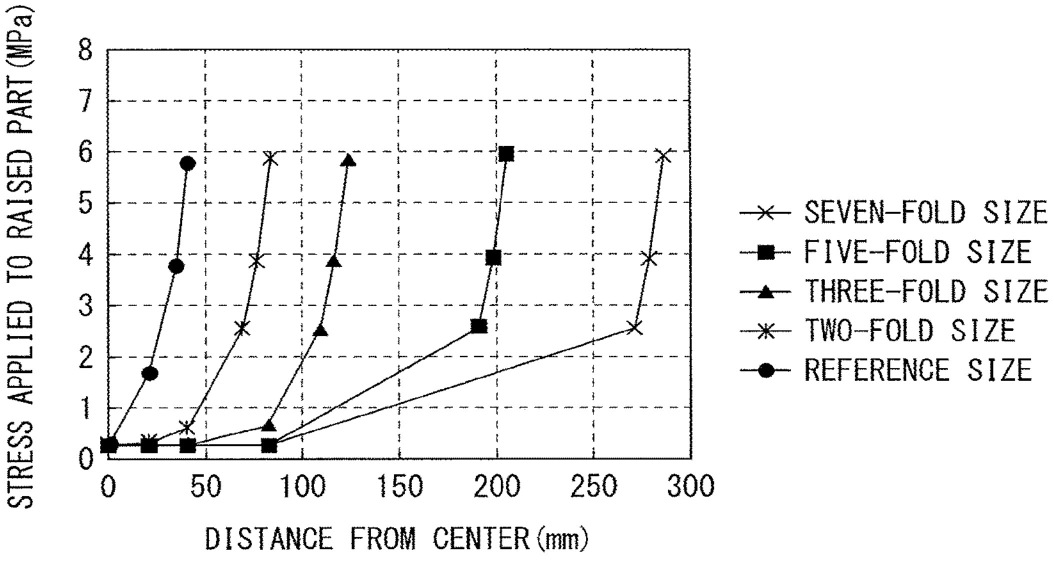
[ FIG. 8 ]
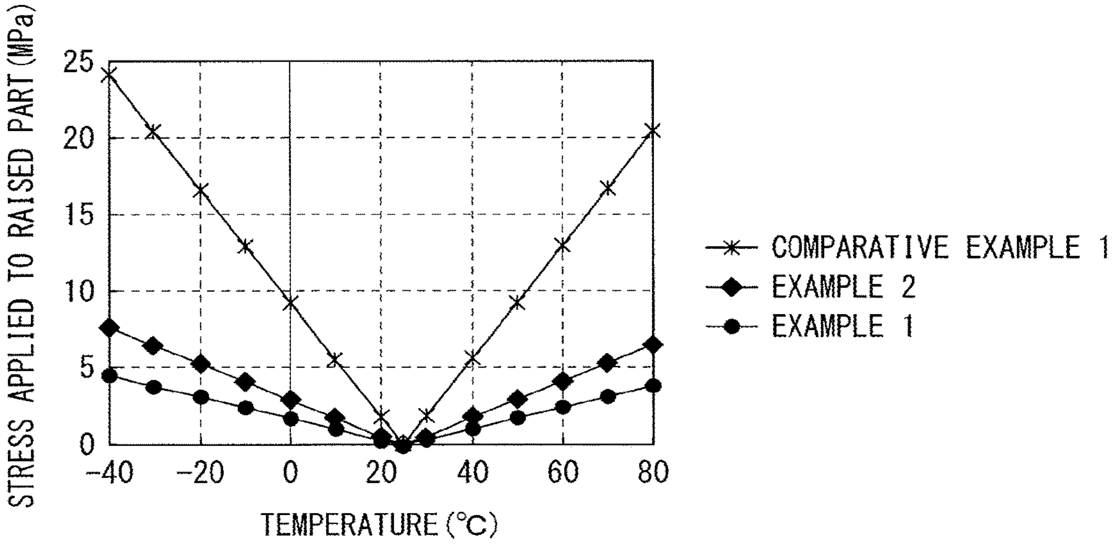

[ FIG. 9 ]
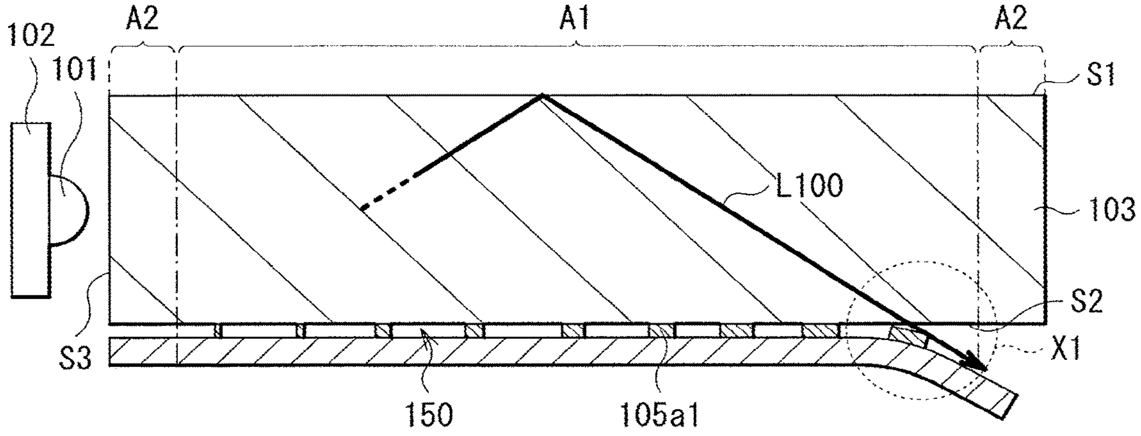
[ FIG. 10 ]
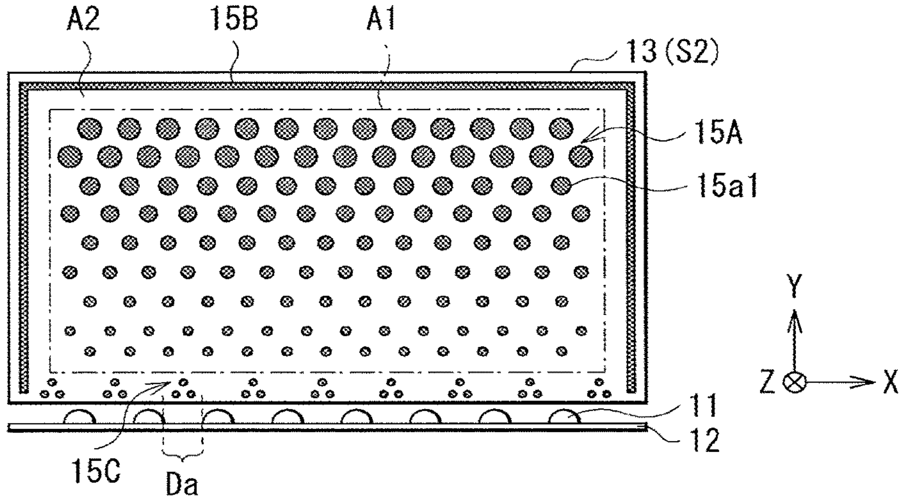
[ FIG. 11 ]
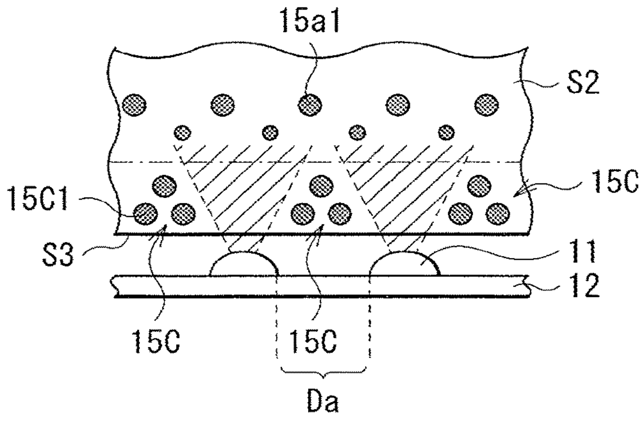

[ FIG. 12A ]
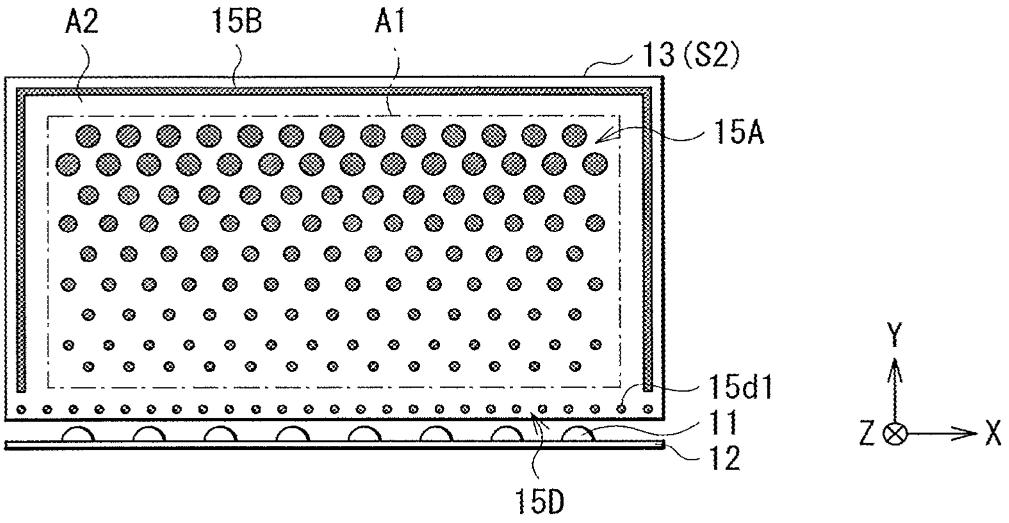
[ FIG. 12B ]
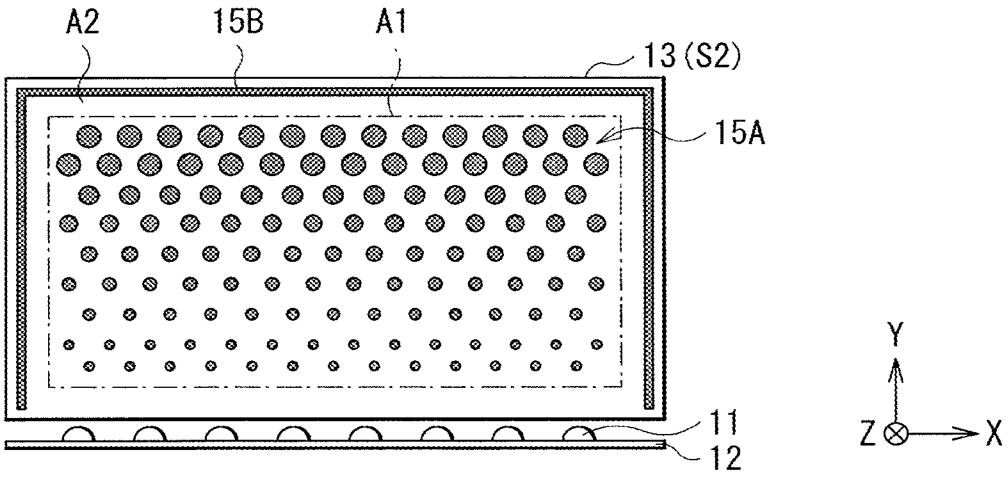

[ FIG. 13A ]
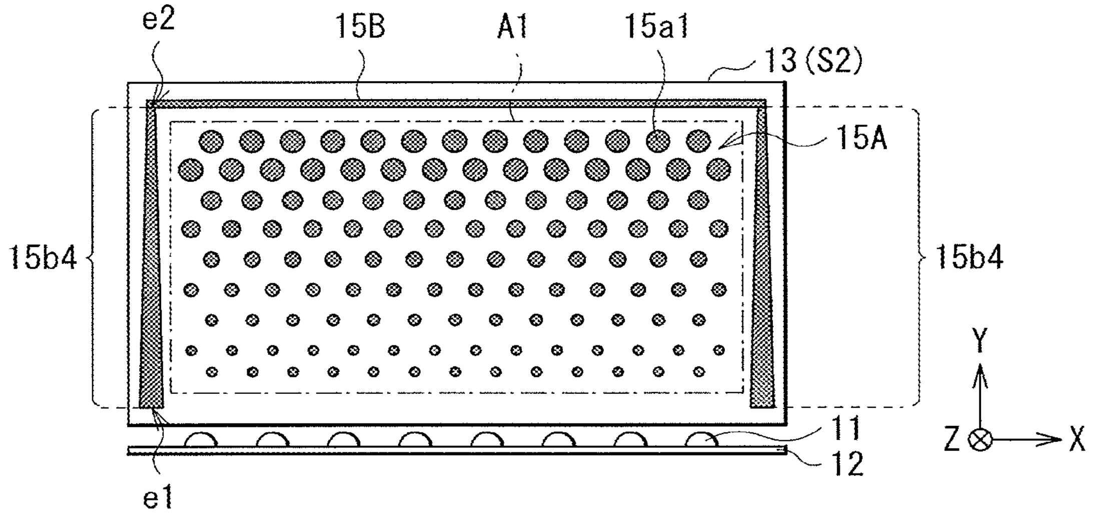
[ FIG. 13B ]
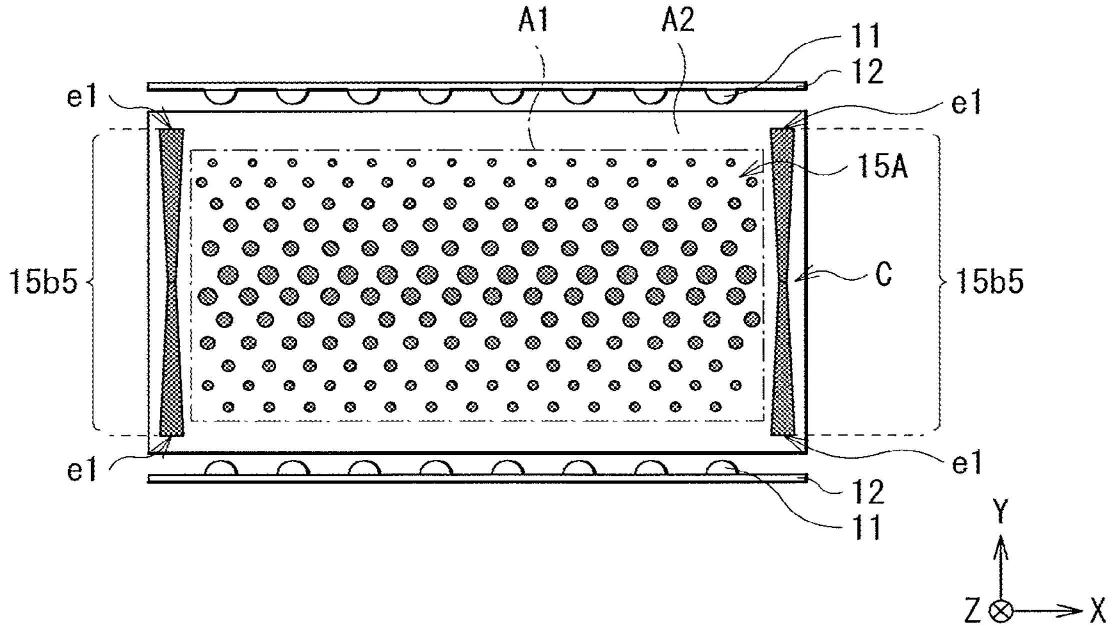

[ FIG. 14A ]
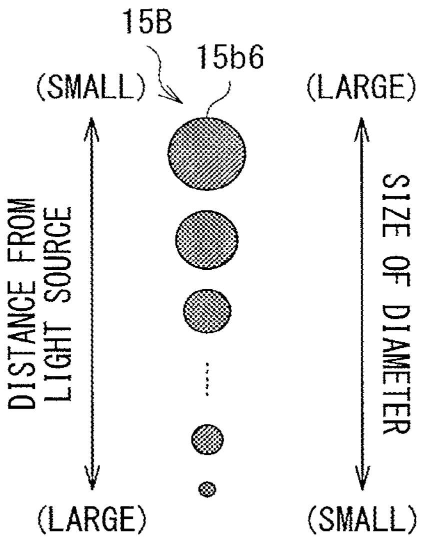
[ FIG. 14B ]
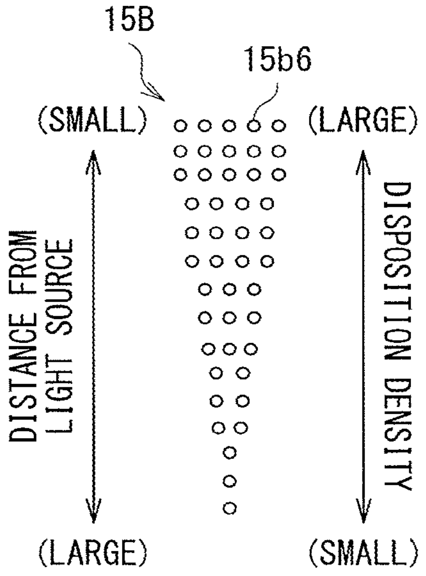

[ FIG. 15 ]
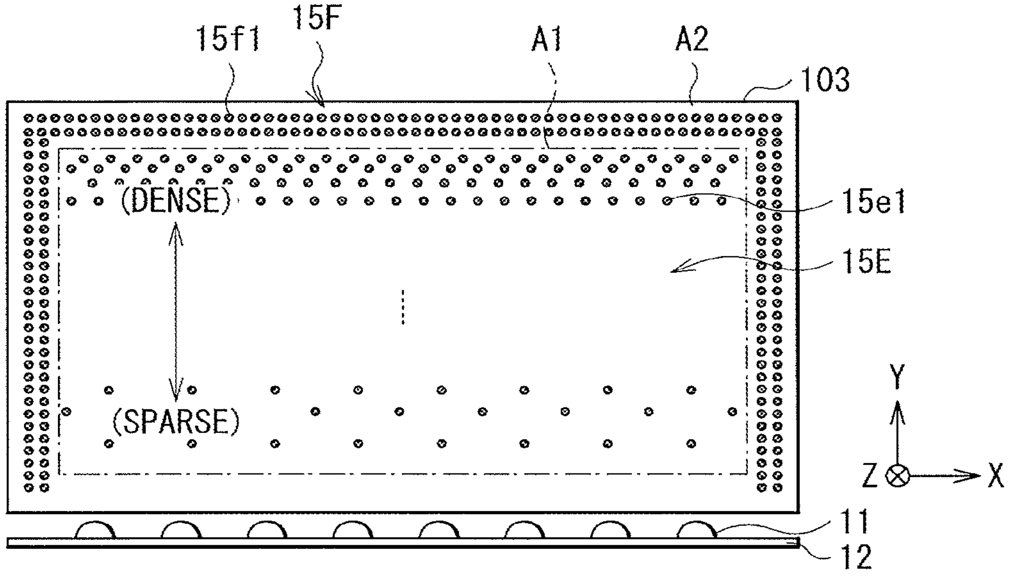
[ FIG. 16 ]
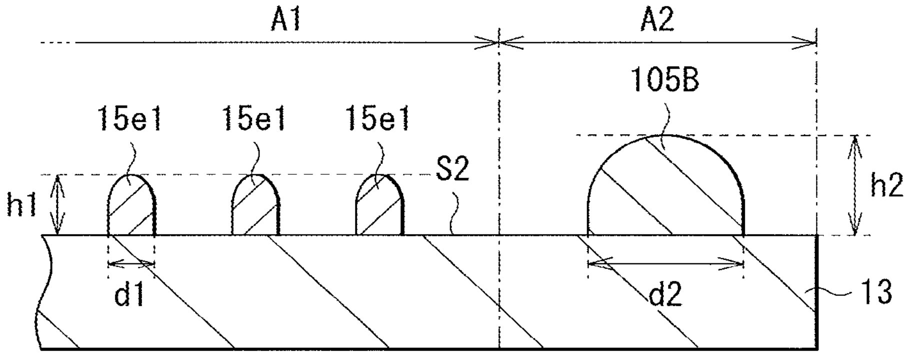
[ FIG. 17 ]
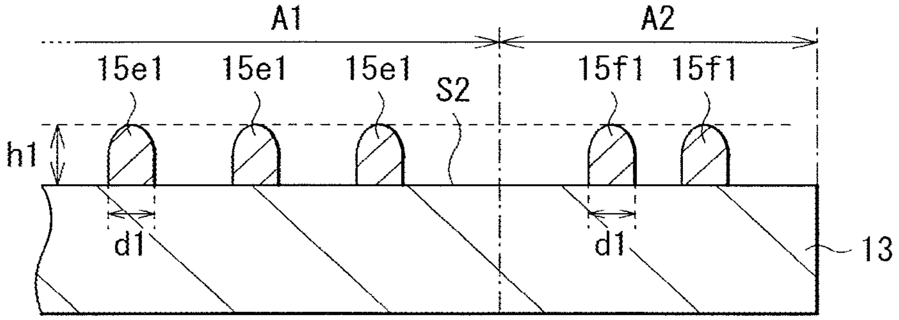

[ FIG. 18 ]
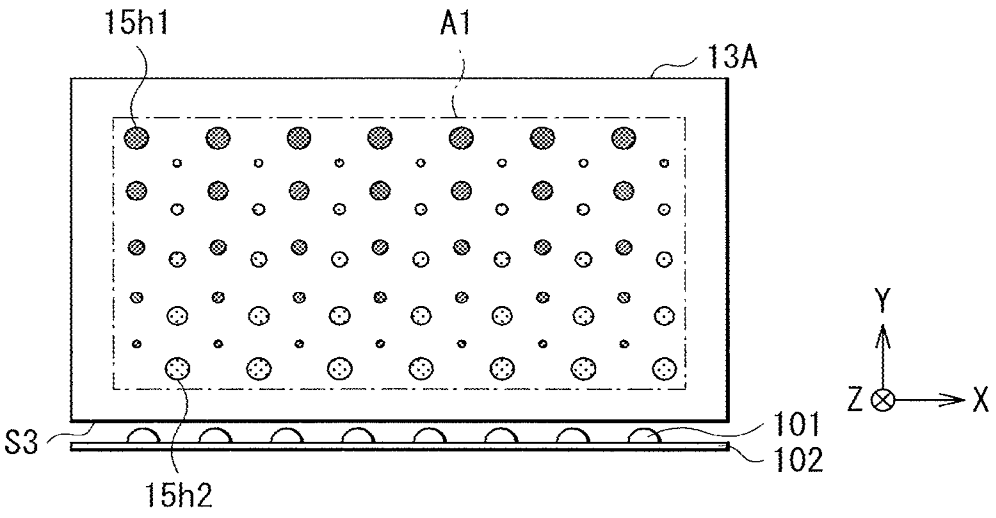
[ FIG. 19A ]
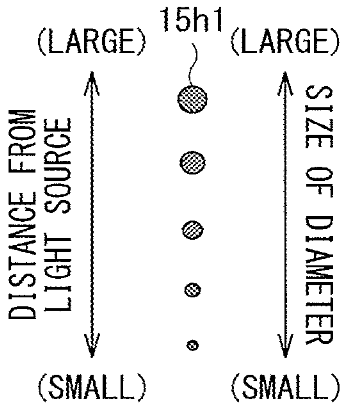
[ FIG. 19B ]
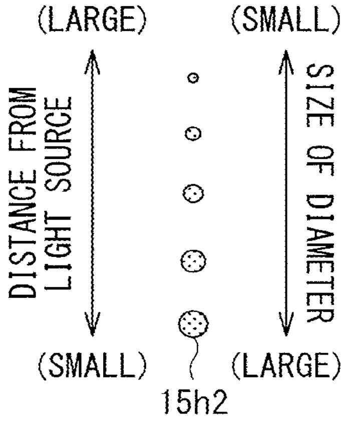

[ FIG. 20 ]
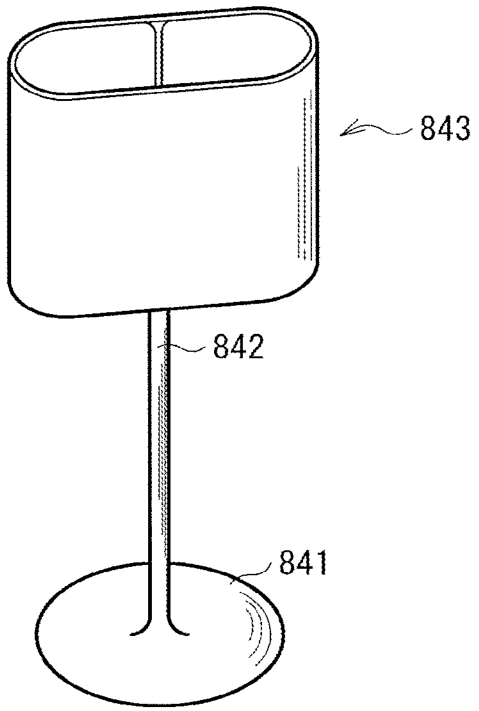
[ FIG. 21 ]
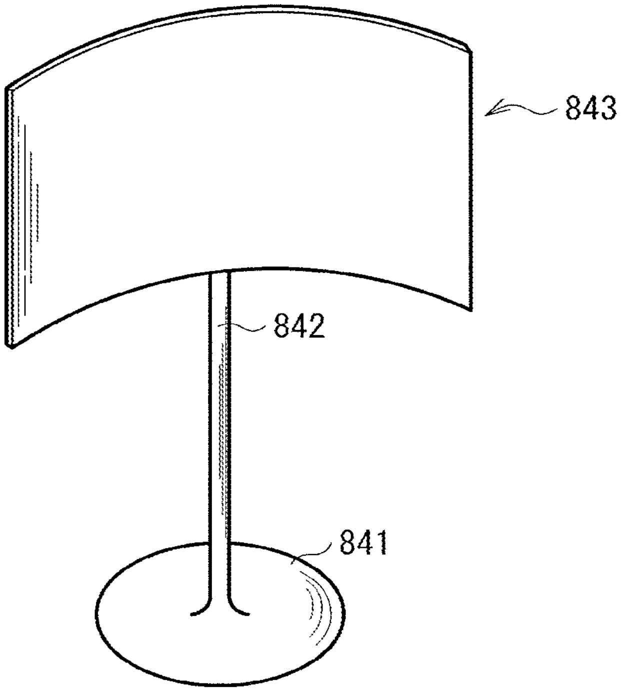

[ FIG. 22 ]
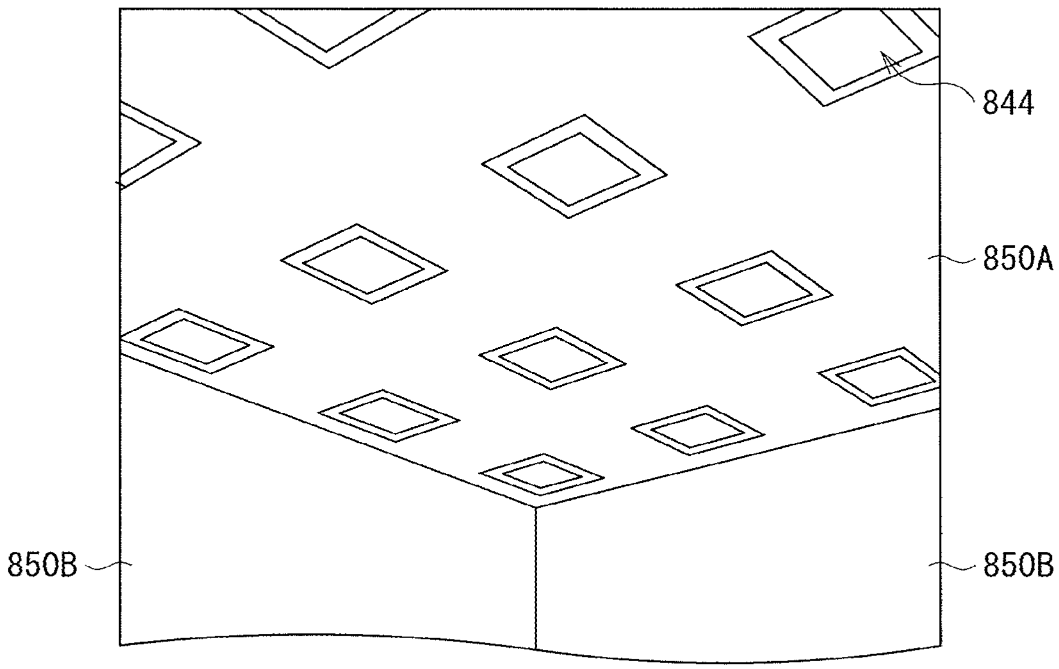

[ FIG. 23A ]
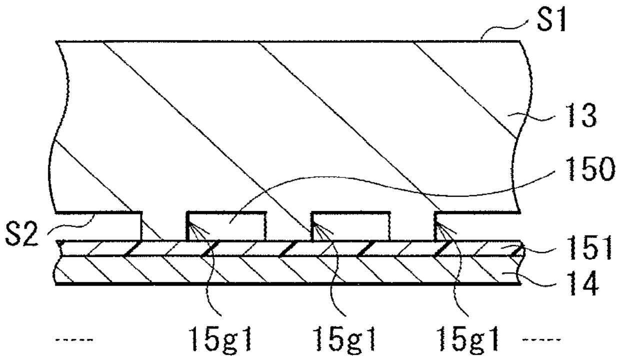
[ FIG. 23B ]
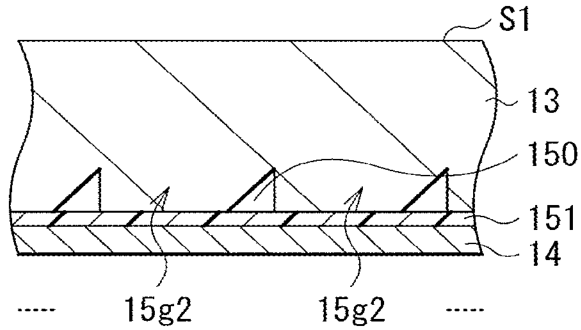
[ FIG. 24 ]
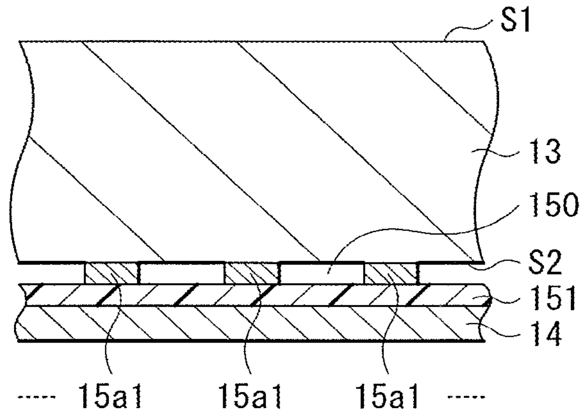

ILLUMINATING UNIT AND DISPLAY APPARATUS

CROSS REFERENCE TO RELATED APPLICATIONS

The present application is a divisional of U.S. patent application Ser. No. 15/771,534, filed on Apr. 27, 2018, which is a national phase entry under 35 U.S.C. § 371 of International Application No. PCT/JP2016/077090, filed on Sep. 14, 2016, which claims the benefit of Japanese Priority Patent Application No. 2015-226428, filed on Nov. 19, 2015, the disclosures of which are hereby incorporated herein by reference.

TECHNICAL FIELD

The present disclosure relates to an illuminating unit, and to a display apparatus that uses the illuminating unit.

BACKGROUND

In a display apparatus such as a liquid crystal display apparatus, an attempt has been made to perform thinning of each of optical members (e.g., an optical sheet, a light-guide plate, and a light source) that configure a display panel or a backlight, in order to achieve thinning of the entire apparatus. This thinning, however, makes it difficult to maintain rigidity of the entire apparatus. In particular, along with increase in size of the display panel, the rigidity is likely to be insufficient. Accordingly, when the optical members of the backlight are stacked, for example, it is desirable that the optical members be subjected to mutual surface adhesion (i.e., entire surfaces thereof be adhered together).

On the other hand, in a case where the mutual surface adhesion is performed, optical characteristics such as luminance (emission luminance or display luminance) are less likely to be maintained. In order to exert the optical characteristics sufficiently, it is desirable to interpose a low-refractive layer (such as an air layer) between the optical members. Thus, a surface light source unit in which optical members are adhered in a dotted or linear partial region has been proposed (see, e.g., PTL 1).

SUMMARY OF INVENTION

In a method of the above-listed PTL 1, however, optical members are easily detached from each other, making it difficult to maintain optical characteristics.

It is desirable to provide an illuminating unit and a display apparatus that make it possible to suppress detachment of optical members from each other and thus to maintain optical characteristics.

A first illuminating unit according to an embodiment of the disclosure includes: a plurality of light sources; a light-guide plate including an end surface disposed to face the plurality of light sources, a first surface that outputs light which is based on incident light from the end surface, and a second surface that faces the first surface and includes a plurality of convex parts; and an optical sheet adhered to side of the second surface of the light-guide plate, with the plurality of convex parts being interposed therebetween. The plurality of convex parts include a plurality of first convex parts disposed in a first region inside the second surface, and one or plurality of second convex parts disposed in at least a portion of a second region on a periphery of the first region inside the second surface.

A first display apparatus according to an embodiment of the disclosure includes a display panel, and the first illuminating unit according to the embodiment of the disclosure that illuminates the display panel.

In the first illuminating unit and the display apparatus according to the respective embodiments of the disclosure, the optical sheet is adhered to the side of the second surface of the light-guide plate, with the plurality of convex parts being interposed therebetween. Further, as the plurality of convex parts, the first convex parts are disposed in the first region of the second surface, thereby allowing light propagating inside the light-guide plate to be reflected and to be outputted from the first surface. Here, the light-guide plate and the optical sheet typically have different linear expansion coefficients; due to a difference in the linear expansion coefficients, stress is likely to be applied to the first convex parts interposed between the light-guide plate and the optical sheet. The disposition of the second raised part in at least a portion of the second region on a periphery of the first region inside the second surface of the light-guide plate allows for increase in adhesion area as well as reduction in the stress applied to the first convex parts.

A second illuminating unit according to an embodiment of disclosure includes: a plurality of light sources; a light-guide plate including an end surface disposed to face the plurality of light sources, a first surface that outputs light which is based on incident light from the end surface, and a second surface that faces the first surface and includes a plurality of convex parts; and an optical sheet adhered to side of the second surface of the light-guide plate, with the plurality of convex parts being interposed therebetween. The plurality of convex parts include a plurality of third convex parts and a plurality of fourth convex parts, and the third convex parts and the fourth convex parts have diffusivities that are different from each other. The diffusivity of each of the third convex parts is larger than the diffusivity of each of the fourth convex parts. A size of a planar shape of or disposition density of the plurality of third convex parts in the second surface becomes larger as being away from the light sources. A size of a planar shape of or disposition density of the plurality of fourth convex parts in the second surface becomes smaller as being away from the light sources.

A second display apparatus according to an embodiment of the disclosure includes a display panel, and the second illuminating unit according to the embodiment of the disclosure that illuminates the display panel.

In the second illuminating unit and the display apparatus according to the respective embodiments of the disclosure, the optical sheet is adhered to the side of the second surface of the light-guide plate, with the plurality of convex parts being interposed therebetween. The plurality of convex parts allow light propagating inside the light-guide plate to be reflected and outputted from the first surface. The plurality of convex parts include the plurality of third convex parts and the plurality of fourth convex parts, and the third convex parts and the fourth convex parts have diffusivities that are different from each other. The diffusivity of each of the third convex parts is larger than the diffusivity of each of the fourth convex parts. A size of a planar shape of or disposition density of the plurality of third convex parts becomes larger as being away from the light sources. A size of a planar shape of or disposition density of the plurality of fourth convex parts becomes smaller as being away from the light sources. This allows the adhesion area to be secured by the convex parts while maintaining a luminance distribution of light outputted from the first surface.

According to the first illuminating unit and the display apparatus of the respective embodiments of the disclosure, the plurality of convex parts are provided in the second surface of the light-guide plate, and the light-guide plate and the optical sheet are adhered, with the plurality of convex parts being interposed therebetween. Further, as the plurality of convex parts, the first convex parts are disposed in the first region. This makes it possible to prevent lowering of the optical characteristics of light outputted from the first surface. Furthermore, the disposition of the second raised part in at least a portion of the second region on the periphery of the first region inside the second surface of the light-guide plate allows for increase in the adhesion area as well as reduction in the stress applied to the first convex parts. Hence, it becomes possible to suppress detachment of the light-guide plate and the optical sheet from each other. This makes it possible to suppress detachment of optical members from each other, and thus to maintain the optical characteristics.

According to the second illuminating unit and the display apparatus of the respective embodiments of the disclosure, the plurality of convex parts are provided in the second surface of the light-guide plate, and the light-guide plate and the optical sheet are adhered, with the plurality of convex parts being interposed therebetween. Further, the plurality of convex parts include the plurality of third convex parts and the plurality of fourth convex parts, and the third convex parts and the fourth convex parts have diffusivities that are different from each other. The diffusivity of each of the third convex parts is larger than the diffusivity of each of the fourth convex parts. In the plurality of third convex parts, a planar shape or disposition density thereof becomes larger as being away from the light sources. In the plurality of fourth convex parts, a planar shape or disposition density thereof becomes smaller as being away from the light sources. This allows the adhesion area to be secured while maintaining the luminance distribution. This makes it possible to suppress detachment of optical members from each other, and thus to maintain the optical characteristics.

It is to be noted that the above descriptions are merely exemplified. The effects of the disclosure are not necessarily limited to the effects described above, and may be other different effects, or may further include other effects.

BRIEF DESCRIPTION OF DRAWINGS

FIG. 1 is a cross-sectional view of a configuration of a display apparatus according to a first embodiment of the disclosure.

FIG. 2 is a schematic plan view of a configuration of light sources and a light-guide plate (a second surface) each illustrated in FIG. 1.

FIG. 3 is a schematic cross-sectional view of a configuration of the light sources, the light-guide plate, and a reflective sheet each illustrated in FIG. 1.

FIG. 4A is a schematic diagram illustrating another example of a planar shape of a second raised part illustrated in FIG. 2.

FIG. 4B is a schematic diagram illustrating another example of the planar shape of the second raised part illustrated in FIG. 2.

FIG. 4C is a schematic diagram illustrating another example of the planar shape of the second raised part illustrated in FIG. 2.

FIG. 5 is a schematic plan view of a configuration of light sources and a light-guide plate according to Comparative Example 1.

FIG. 6 is a schematic cross-sectional view of a configuration of the light sources, the light-guide plate, and a reflective sheet each illustrated in FIG. 5.

FIG. 7 is a characteristic diagram illustrating a relationship between a distance from an in-plane center and stress applied to a raised part.

FIG. 8 is a characteristic diagram illustrating a relationship between a temperature and stress applied to a raised part.

FIG. 9 is a characteristic diagram that describes detachment of the light-guide plate and the reflective sheet from each other due to stress.

FIG. 10 is a schematic plan view of a configuration of a light-guide plate (a second surface) according to Modification Example 1, together with the light sources.

FIG. 11 is an enlarged schematic diagram illustrating the light sources and a region of the second surface in proximity to the light sources.

FIG. 12A is a schematic plan view of another configuration of the light-guide plate illustrated in FIG. 10.

FIG. 12B is a schematic plan view of another configuration of the light-guide plate illustrated in FIG. 10.

FIG. 13A is a schematic plan view of a configuration of a light-guide plate (a second surface) according to Modification Example 2, together with the light sources.

FIG. 13B is a schematic plan view of another configuration of the light-guide plate illustrated in FIG. 13A.

FIG. 14A is a schematic diagram illustrating a configuration example of a second raised part according to Modification Example 3.

FIG. 14B is a schematic diagram illustrating another configuration example of the second raised part illustrated in FIG. 14A.

FIG. 15 is a schematic plan view of a configuration of a light-guide plate (a second surface) according to Modification Example 4, together with the light sources.

FIG. 16 is a schematic cross-sectional view that describes workings of a light-guide plate according to Comparative Example 2.

FIG. 17 is a schematic cross-sectional view that describes workings of the light-guide plate illustrated in FIG. 15.

FIG. 18 is a schematic plan view of a configuration of a light-guide plate (a second surface) according to a second embodiment of the disclosure, together with the light sources.

FIG. 19A is a schematic diagram that describes a configuration of disposition of convex parts of a first raised part group illustrated in FIG. 18.

FIG. 19B is a schematic diagram that describes a configuration of disposition of convex parts of a second raised part group illustrated in FIG. 18.

FIG. 20 illustrates an appearance of a lighting apparatus according to Modification Example 5.

FIG. 21 illustrates an appearance of another example of the lighting apparatus illustrated in FIG. 20.

FIG. 22 illustrates an appearance of another example of the lighting apparatus illustrated in FIG. 20.

FIG. 23A is a schematic cross-sectional view of a configuration of a light-guide plate and a reflective sheet according to another modification example.

FIG. 23B is a schematic cross-sectional view of a configuration of a light-guide plate and a reflective sheet according to another modification example.

FIG. 24 is a schematic cross-sectional view of a configuration of a light-guide plate and a reflective sheet according to another modification example.

DETAILED DESCRIPTION

Some embodiments of the disclosure are described in detail below in the following order with reference to drawings.

1. First Embodiment (An example of a display apparatus including an illuminating unit provided with a linear raised part in a peripheral region around an effective region inside a second surface)
2. Modification Example 1 (An example of providing convex parts in a selective region, of a peripheral region, in a region in proximity to light sources)
3. Modification Example 2 (An example in which a linear raised part is so disposed in a peripheral region as to have a width that becomes larger as being closer to light sources)
4. Modification Example 3 (An example in which circular convex parts are so disposed in a peripheral region as to have a diameter or disposition density that becomes larger as being closer to light sources)
5. Modification Example 4 (An example in which convex parts of the same material and having the same diameter are disposed both in an effective display region and a peripheral region)
6. Second Embodiment (An example in which two types of convex parts having different diffusivities are disposed in an effective display region depending on a distance from light sources)
7. Modification Example 5 (Another example of Lighting Apparatus)
8. Other Modification Examples (Other configuration examples of convex parts)

First Embodiment

[Configuration]

FIG. 1 illustrates a schematic configuration of a display apparatus (a display apparatus 1) according to an embodiment of the disclosure. The display apparatus 1 is a liquid crystal display apparatus that is used as a television, for example.

The display apparatus 1 includes an illuminating section (backlight) 10, an optical sheet 20, and a display panel 30. The display panel 30, the optical sheet 20, and the illuminating section 10 are disposed inside an illustrated housing (an outer housing), for example.

In the display apparatus 1, an image is displayed in an effective display region A1, and a peripheral region (a bezel region) A2 around the effective display region A1 is shielded from light by the housing or a light shielding member that is unillustrated. It is to be noted that the effective display region A1 of the present embodiment corresponds to a specific example of a "first region" of the disclosure, and a peripheral region A2 thereof corresponds to a specific example of a "second region" of the disclosure.

The display panel 30 serves to display an image such as a moving image or a still image. The display panel 30 includes a plurality of pixels inside the effective display region A1. The display panel 30 has a configuration in which, for example, a liquid crystal layer (unillustrated) is sealed between a TFT (Thin Film Transistor) substrate 31 and a color filter (CF) substrate 32. The display panel 30 includes a polarizing plate 33*a* and a polarizing plate 33*b* that are joined, respectively, to light incident side of the TFT substrate 31 and light output side of the CF substrate 32.

The TFT substrate 31 includes, on a glass substrate, for example, a plurality of TFT devices, and wiring lines such as a gate line and a source line to be coupled to the TFT devices, with pixel electrodes being formed that are electrically coupled to the respective TFT devices. One end of the TFT substrate 31 is electrically coupled to, for example, a drive substrate (unillustrated) that is attached to rear side of the display apparatus 1 via a printed substrate, etc. The CF substrate 32 includes, on a glass substrate, for example, color filters of red (R), green (G), and blue (B), and a counter electrode. The liquid crystal layer includes, for example, a liquid crystal that is driven in a mode such as a VA (Virtical Alignment) mode, an IPS (In Plane Switching) mode, and a TN (Twisted Nematic) mode.

The optical sheet 20 has a configuration in which, for example, a diffusing sheet (a diffusing plate), a luminance-enhancing film (a prism sheet), and a reflective polarizing film, etc. are so stacked as to have one or plurality of layers. In this example, the optical sheet 20 is interposed between the display panel 30 and the illuminating section 10.

The illuminating section 10 is a backlight of a so-called edge light system, for example. The illuminating section 10 includes, for example, a plurality of light sources 11, an end surface S3 that faces the light sources 11, a light-guide plate 13 having a light output surface (a second surface S2), and a reflective sheet 14. FIG. 2 schematically illustrates a planar configuration example of the light-guide plate 13 and the light sources 11. FIG. 3 is a cross-sectional view of a detailed configuration of the illuminating section 10. The illuminating section 10 corresponds to a specific example of an "illuminating unit" of the disclosure. Further, the reflective sheet 14 corresponds to a specific example of an "optical sheet" of the disclosure.

The light sources 11 each include an LED (Light Emitting Diode: Light Emitting Diode) that emits white light, for example. Alternatively, the light sources 11 may each include an LED that emits red light, green light, or blue light, for example. The light sources 11 are disposed to face the end surface (the end surface S3) of the light-guide plate 13, for example. In this example, the plurality of light sources 11 are disposed along one long side of the light-guide plate 13 having a rectangular shape (to face the end surface S3 corresponding to the one long side). However, the location where the light sources 11 are disposed is not limited thereto. For example, the plurality of light sources 11 may be disposed along each of two long sides (to face each of the end surfaces S3 corresponding to the two long sides). Further, the plurality of light sources 11 may be disposed along one or two of short sides. Alternatively, the plurality of light sources 11 may be disposed along each of the four sides.

The plurality of light sources 11 that face one of the end surfaces S3 are disposed at an equal interval, for example. The number of the plurality of light sources 11 and an arrangement pitch thereof are set appropriately depending on luminance of an individual one of the light sources 11, and thickness, size, and a constituent material of the light-guide plate 13, etc.

A light source substrate 12 serves to hold the plurality of light sources 11 that are arranged along the end surface S3. The light source substrate 12 is electrically coupled to a light source drive circuit that drives each of the light sources 11 to be turned ON and OFF. The light source drive circuit is formed on the drive substrate attached to the rear side of the display apparatus 1, for example.

The light-guide plate 13 serves to cause light incident from the end surface S3 to propagate an inside thereof by reflection, and thereafter to output the light from a first surface S1 (to output, from the first surface S1, light which is based on the incident light from the end surface S3). A planar shape (an X-Y planar shape) of the light-guide plate 13 is, for example, rectangular, and the light-guide plate 13 includes four end surfaces S3. Here, the light-guide plate 13 includes, as one example, one end surface S3 that faces the light sources 11, and three end surfaces S3 that do not face the light sources 11. The light-guide plate 13 includes, for example, a transparent resin such as acrylic resin, polycarbonate (PC) resin, and cycloolefin polymer (COP) resin. Examples of the acrylic resin include PMMA (polymethyl methacrylate), a mixture of PMMA and polystyrene, and polymethacrylic styrene. Alternatively, the light-guide plate 13 may include glass. A surface (the second surface S2) that faces the first surface S1 of the light-guide plate 13 includes, thereon, a plurality of convex parts (first convex parts **15*a*1 and a second raised part 15B described later) being formed by means of printing or processing. The reflective sheet 14 is adhered to side of the second surface S2 of the light-guide plate 13**, with the plurality of convex parts being interposed therebetween.

The reflective sheet 14 serves to prevent the light incident from the light sources 11 from being leaked to the side of the second surface S2 of the light-guide plate 13, and to efficiently reflect the light propagating inside the light-guide plate 13.

In the present embodiment, the plurality of first convex parts **15*a*1 are disposed in the effective display region A1 inside the second surface S2 of the light-guide plate 13 of the illuminating section 10, and the second raised part 15B is disposed in the peripheral region A2, as illustrated in FIG. 2**.

The plurality of first convex parts **15*a*1 (a dot pattern 15A) each have a light diffusion property. When the light propagating inside the light-guide plate 13 by reflection enters the first convex parts 15*a*1, the light is scattered by the first convex parts 15*a*1 (i.e., a condition for total reflection is violated) to be outputted from the first surface S1. A planar shape (an X-Y planar shape) of each of the first convex parts 15*a*1 in the second surface S2 is, for example, circular or polygonal (circular in this example). In the dot pattern 15A, for example, a size (diameter) of each planar shape of or disposition density of the plurality of first convex parts 15*a*1 varies depending on a distance from the light sources 11 to allow an in-plane luminance distribution of outputted light from the second surface S2 to be uniform. In the example of FIG. 2, the dot pattern 15A has a configuration in which the diameter of each of the plurality of first convex parts 15*a*1 becomes larger as being away from the light sources 11. It is to be noted that, although the raised part has the light diffusion property in this example, it is not necessary for the raised part to have the light diffusion property. For example, when the reflective sheet 14** has a diffusion property, the raised part may not necessarily have the light diffusion property.

Each of the first convex parts **15*a*1 is, for example, pattern-formed in the second surface S2 of the light-guide plate 13 by means of a printing method such as screen printing. The first raised part 15*a*1 is formed by, for example, dispersing particles of a material such as silica and titanium in a resin, etc. having adhesiveness. As a material having adhesiveness, it is desirable to select a material having a low absorption factor in a light emission wavelength region of the light source 11, a sufficient adhesive force to the light-guide plate 13 and the reflective sheet 14, and a low Young' modulus (having high extensibility), from the viewpoint of optical characteristics. The first convex parts 15A1 each have adhesiveness, thereby allowing the second surface S2 of the light-guide plate 13 and the reflective sheet 14 to be adhered together, with the first convex parts 15*a*1 being interposed therebetween. A spacing among the first convex parts 15*a*1 constitutes a cavity (an air layer 150**).

A planar shape of the second raised part 15B in the second surface S2 is, for example, linear, and the second raised part 15B is disposed (around the entire periphery of the effective display region A1) to surround the effective display region A1, for example. In this example, a linear width of the second raised part 15B is constant throughout the entire periphery. The width of the second raised part 15B may be set depending on a width of a bezel of the display apparatus 1, and is not particularly limited. However, it is desirable to adopt the width that is as large as possible, because stress applied to the first convex parts **15*a*1 is reducible. On the other hand, when the width of the second raised part 15B becomes too large, the optical characteristics may be lowered in some cases. Accordingly, a proper width may be preferably set in consideration of a balance between the effect of reduced stress and the optical characteristics. Although the second raised part 15B is formed continuously throughout the entire periphery in this example, the second raised part 15B may be separated in a selective portion (may partially have a gap). For example, when the second raised part 15B is formed throughout the entire periphery, air is less likely to be leaked at high temperature or at low temperature; thus, it is desirable that a gap be present at one or more locations. Further, the planar shape of the second raised part 15B is not limited to the shape illustrated in FIG. 2. For example, as illustrated in FIG. 4A, the second raised part 15B may include a plurality of linear convex parts 15*b*1 and 15*b*2 that are disposed in parallel. Furthermore, as illustrated in FIG. 4B, the second raised part 15B may have a broken-line shape (i.e., a plurality of convex parts 15*b*3 may be disposed, with gaps being interposed therebetween). Alternatively, as illustrated in FIG. 4C, the second raised part 15**B may have a wavy shape.

Similarly to the first raised part **15*a*1, the second raised part 15B is, for example, pattern-formed by means of a printing method such as screen printing. The second raised part 15B includes a material having adhesiveness, for example. A constituent material of the second raised part 15B may be the same material as that of the first raised part 15*a*1, or may be a material different from that of the first raised part 15*a*1. It is desirable, however, that the second raised part 15B include the same material as that of the first raised part 15*a*1**, in terms of productivity.

Similarly to the first raised part **15*a*1, the second raised part 15B has adhesiveness, thereby allowing the second surface S2 of the light-guide plate 13 and the reflective sheet 14 to be adhered together, with the second raised part 15B being interposed therebetween. In this manner, the light-guide plate 13 and the reflective sheet 14 are partially adhered at a plurality of discrete locations corresponding to locations where the first convex parts 15*a*1 and the second raised part 15B are formed, instead of adhesion of respective entire surfaces of the light-guide plate 13 and the reflective sheet 14**.

Workings and Effects

In the display apparatus 1, a drive voltage is applied between the TFT substrate 31 and the CF substrate 32, thereby causing optical characteristics of the liquid crystal in the display panel 30 to vary on a pixel-by-pixel basis. Light emitted from the illuminating section 10 is transmitted through the display panel 30 via the optical sheet 20, thereby allowing an image to be displayed on the display panel 30.

In this situation, when the light source 11 is driven in the illuminating section 10, light emitted from the light source 11 enters the light-guide plate 13 from the end surface S3. The incident light from the end surface S3 propagates inside the light-guide plate 13 while being repeatedly reflected between the first surface S1 and the second surface S2. The light propagating inside the light-guide plate 13 enters each of the first convex parts 15*a*1 of the dot pattern 15A provided in the second surface S2, thereby causing the light to be scattered (i.e., the condition for the total reflection is violated), and is outputted from the first surface S1.

Here, in a typical display apparatus, an attempt has been made to perform thinning of each of optical members (e.g., an optical sheet, a light-guide plate, and a light source) that configure a backlight, for example, in order to achieve thinning. However, a method of stacking the thinned optical members or adhering only an outer peripheral part is likely to cause insufficiency in rigidity of the entire apparatus. In particular, along with increase in size of the display panel, the rigidity is likely to be insufficient. Accordingly, it is desirable that, for example, the optical members of the backlight be subjected to surface adhesion (i.e., entire surfaces thereof be adhered together).

In the case where the surface adhesion is performed, however, optical characteristics such as luminance (emission luminance or display luminance) are less likely to be maintained. In order to exert the optical characteristics sufficiently, it is desirable to interpose a low-refractive layer (such as an air layer) between the optical members.

For example, FIG. 5 illustrates a planar configuration of the light-guide plate and the light sources according to Comparative Example 1 of the present embodiment. FIG. 6 illustrates a cross-sectional configuration of an illuminating section 100 using the light-guide plate. In this Comparative Example 1, light sources 101 held by a light source substrate 102 are disposed to face the end surface S3 corresponding to one side of a rectangular shape of a light-guide plate 103, similarly to the foregoing embodiment. Further, a plurality of convex parts 105*a*1 are disposed in the second surface S2 that faces the first surface S1 of the light-guide plate 103. Furthermore, the light-guide plate 103 and a reflective sheet 104 are adhered together, with the plurality of convex parts 105*a*1 being interposed therebetween. In other words, the light-guide plate 103 and the reflective sheet 104 are partially adhered together in a manner corresponding to locations where the convex parts 105*a*1 are disposed. This allows for formation of the air layer 150 between the light-guide plate 103 and the reflective sheet 104, thus making it easier to maintain the optical characteristics than the case of the above-described surface adhesion. In the comparative example, however, the convex parts 105*a*1 are disposed only in the effective display region A1 inside the second surface S2 of the light-guide plate 103. The plurality of convex parts 105*a*1 are disposed in the effective display region A1 to have a planar shape size or disposition density that varies depending on a distance from the light sources 101.

Here, FIG. 7 illustrates a relationship between a distance from the center of the light-guide plate 103 and stress applied to a raised part. Further, FIG. 7 also illustrates characteristics of each of cases where a size of the light-guide plate 103 is varied to be twice, three times, five times, and seven times a reference size of the light-guide plate 103. At high temperature or at low temperature, breaking stress mainly in a shearing direction focuses on the convex parts 105*a*1 that are each an adhered part, due to a difference in linear expansion coefficients between materials of the light-guide plate 103 and the reflective sheet 104. The stress applied to the convex parts 105*a*1 becomes larger as being closer to an outer periphery of the light-guide plate 103, and the stress tends to focus on an outer peripheral part. Further, as illustrated in FIG. 8, the stress varies depend on temperature. It is to be noted, in FIG. 8, that Example 1 indicates characteristics of a case where the linear second raised part 15B is formed throughout the entire periphery as illustrated in FIG. 2, whereas Example 2 indicates characteristics of a case where the broken-line shaped second raised part 15B is formed as illustrated in FIG. 4B As a result, as schematically illustrated in FIG. 9, the convex parts 105*a*1 are likely to be deformed or detached at the outer peripheral part of the light-guide plate 103, for example, thereby causing the reflective sheet 104 to be detached (x1 in the drawing). Light $L_{100}$ having propagated inside the light-guide plate 103 enters the detached part, for example, light leakage, etc. from the second surface S2 occurs, thus lowering the optical characteristics. In addition, it is often the case that the convex parts 105*a*1 are each formed to have a smaller diameter as being closer to the light sources 101, for example. In this case, adhesion area near the light sources 101 as a heat source is smaller than that in other regions. This also makes the light-guide plate 103 and the reflective sheet 104 likely to be detached from each other, thus leading to lowering of the optical characteristics.

In contrast, in the present embodiment, the reflective sheet 14 is adhered to side of the second surface S2 of the light-guide plate 13, with the plurality of convex parts (the first convex parts 15*a*1 and the second raised part 15B) being interposed therebetween. Specifically, the plurality of first convex parts 15*a*1 each having a light diffusion property in the effective display region A1 of the second surface S2. This causes light propagating inside the light-guide plate 13 to be diffused and outputted from the first surface S1. In this manner, the light-guide plate 13 and the reflective sheet 14 are partially adhered at the first convex parts 15*a*1 (i.e., the air layer 150 is interposed therebetween), and thus optical loss at the interface is less likely to occur than a case of the surface adhesion, preventing lowering of the optical characteristics.

Here, as described above, stress due to a difference in linear expansion coefficients between the light-guide plate 13 and the reflective sheet 14 is likely to be applied to the convex parts 15*al* between the light-guide plate 13 and the reflective sheet 14. The disposition of the second raised part 15B in at least a portion of the peripheral region A2 of the second surface S2 of the light-guide plate 13 allows for increase in the adhesion area as well as reduction in the stress applied to the first convex parts 15*a*1. Hence, the detachment of the light-guide plate 13 and the reflective sheet 14 from each other is suppressed. This prevents lowering of the optical characteristics of light outputted from the first surface S1.

As described above, in the present embodiment, the disposition of the second raised part 15B in at least a portion of the peripheral region A2 around the effective display region A1 of the second surface S2 of the light-guide plate 13 makes it possible to suppress the detachment of the light-guide plate 13 and the reflective sheet 14 from each other. Hence, the detachment of optical members from each other (e.g., the detachment of the light-guide plate 13 and the reflective sheet 14 from each other) is suppressed, making it possible to maintain the optical characteristics.

Description is given next of modification examples of the foregoing first embodiment and another embodiment. Hereinafter, components similar to those of the foregoing first embodiment are denoted with the same reference numerals, and description thereof is omitted where appropriate.

Modification Example 1

FIG. 10 illustrates a planar configuration of the light-guide plate 13 (the second surface S2) and the light sources 11 according to Modification Example 1. FIG. 11 illustrates, in an enlarged manner, a region in proximity to the light sources 11 illustrated in FIG. 10. The foregoing first embodiment exemplifies the configuration in which the second raised part 15B is formed in the peripheral region A2 throughout the entire periphery of the effective display region A1. However, as in the present modification example, the second raised part may have a shape and a layout that are different from those in other regions (regions distant from the light sources) in the region, of the peripheral region A2, in proximity to the light sources 11.

For example, in regions, of the peripheral region A2, distant from the light sources 11 (regions corresponding to three sides, of the second surface S2, that do not face the light sources 11), the linear second raised part 15B is disposed to surround the effective display region A1, similarly to the foregoing first embodiment. Meanwhile, in the region, of the peripheral region A2, in proximity to the light sources 11 (a region corresponding to one side, of the second surface S2, that faces the light sources 11), second convex parts 15C are disposed in a selective region, unlike the foregoing first embodiment.

It is desirable that the second convex parts 15C be each disposed in a region Da, of the peripheral region A2, between the light sources 11. It is to be noted that the hatched part in FIG. 11 schematically indicates light incident from the light sources 11. The second raised part 15C includes one or plurality of (three in this example) convex parts 15*c*1. The layout of the convex parts 15*c*1 in the second raised part 15C is not particularly limited. In this example, however, the three convex parts 15*c*1 each having a circular planar shape are disposed to form a triangle as a whole.

The raised part 15*c*1 is, for example, pattern-formed by means of a printing method such as screen printing, similarly to the second raised part 15B. The raised part 15*c*1 includes a material having an optical diffusion property and adhesiveness, for example. A constituent material of the raised part 15*c*1 may be the same material as that of the above-described first raised part 15*a*1, or may be a material different from that of the first raised part 15*a*1. It is desirable, however, that the raised part 15*c*1 include the same material as that of each of the first raised part 15*a*1 and the second raised part 15B. One reason for this is that it is possible to form the first raised part 15*a*1 and the second convex parts 15B and 15C collectively, and thus to reduce the number of steps as compared with a case of formation in separate steps.

In the present modification example, the disposition of the second convex parts 15B and 15C in the peripheral region A2 allows for increase in the adhesion area while reducing the stress applied to the first convex parts 15*a*1 disposed in the effective display region A1. Hence, it is possible to suppress the detachment of the light-guide plate 13 and the reflective sheet 14 (unillustrated in FIGS. 10 and 11) from each other. This makes it possible to achieve effects similar to those of the foregoing first embodiment.

Further, luminance unevenness is likely to occur due to luminance and arrangement pitch, etc. of the light sources 11, in a region, of the peripheral region A2, in proximity to the light sources 11. The disposition of the second convex parts 15C in the selective region (e.g., the region Da between the light sources 11) as in the present modification example makes it possible to suppress the luminance unevenness while securing the adhesion area. It becomes possible to enhance the optical characteristics of light outputted from the light-guide plate 13 more than the foregoing first embodiment.

It is to be noted that the second part disposed in the region in proximity to the light sources 11 is not limited to the above-described example. In addition, in the region in proximity to the light sources 11, for example, a dot pattern 15D may be formed in which a plurality of circular second convex parts 15*d*1 are disposed at an equal interval, as illustrated in FIG. 12A. Alternatively, a configuration may be adopted in which the second raised part is not disposed in the region in proximity to the light sources 11 (i.e., in which the second raised part 15B is disposed only in the region distant from the light sources 11), as illustrated in FIG. 12B.

Modification Example 2

FIG. 13A illustrates a planar configuration of the light-guide plate 13 (the second surface S2) and the light sources 11 according to Modification Example 2. Although, in the foregoing first embodiment, the second raised part 15B has a constant width throughout the entire periphery in the peripheral region A2, the second raised part 15B may have a width that varies depending on the distance from the light sources 11.

For example, as in the present modification example, the width of the linear second raised part 15B becomes larger as being closer to the light sources 11 (i.e., as the distance from the light sources 11 becomes smaller) in the peripheral region A2. Specifically, the second raised part 15B has a part (a raised part 15*b*4) whose width becomes gradually larger as being toward an end part e1 on side of the light sources 11 from an end part e2 on side opposite to the side of the light sources 11, in a region corresponding to each of two short sides of a planar shape of the second surface S2. The raised part 15*b*4 may be disposed continuously with other parts of the second raised part 15B, or may be disposed separately from other parts thereof. Here, as one example, the raised part 15*b*4 is disposed continuously in a region corresponding to three sides (a region except the region in proximity to the light sources 11) of the planar shape of the second surface S2. It is to be noted that, although illustration is not particularly given, the second raised part may be or may not be disposed in the region in proximity to the light sources 11. In the latter case, it is desirable that the second parts 15C be disposed in the selective region as illustrated in FIG. 10.

In the present modification example, the disposition of the second raised part 15B including the convex parts 15*b*4 in the peripheral region A2 allows for increase in the adhesion area while reducing the stress applied to the first convex parts 15*a*1 disposed in the effective display region A1. Hence, it is possible to suppress the detachment of the light-guide plate 13 and the reflective sheet 14 (unillustrated in FIG. 13A) from each other. This makes it possible to achieve effects similar to those of the foregoing first embodiment.

Further, in the effective display region A1, the dot pattern 15A is formed in which the diameter of each of or the disposition density of the first convex parts 15*a*1 becomes larger as being away from the light sources 11, as described above. In such a configuration, the adhesion area becomes smaller in proximity to the light sources 11 as a heat source, thus making the reflective sheet 14 more likely to be detached. The disposition of the raised part 15*b*4 having a width that becomes larger as being closer to the light sources 11 as in the present modification example makes it easier to secure the adhesion area in proximity to the light sources 11. This makes it easier to suppress the detachment than the foregoing first embodiment, thus leading to enhancement of the optical characteristics and the rigidity.

It is to be noted that, in a case where, for example, the light sources 11 are disposed in each of two long sides of the planar shape of the second surface S2, a raised part 15*b*5 is disposed as the second raised part in each of regions corresponding to two short sides of the planar shape of the second surface S2, as illustrated in FIG. 13B. The raised part 15*b*5 has a planar shape in which a width thereof becomes larger as being toward both ends (two end parts e1) on sides of the light sources 11 from a center part "c". Also in a case where the light sources 11 are disposed along two sides, the effective display region A1 tends to have the adhesion area that becomes smaller in proximity to the light sources 11, similarly to the case where the light sources 11 are disposed along one side as described above. In this configuration, the disposition of the raised part 15*b*5 makes it easier to secure the adhesion area in proximity to the light sources 11.

Further, although the foregoing Modification Example 2 exemplifies the configuration in which the width of the linear second raised part 15B varies depending on the distance from the light sources 11, the planar shape of the second raised part 15B is not limited to a linear shape, and may be the broken-line shape as illustrated in FIG. 4B, or the wavy shape as illustrated in FIG. 4C.

Modification Example 3

FIG. 14A illustrates a planar configuration of the second raised part according to Modification Example 3. The foregoing Modification Example 2 describes the configuration example in which the linear (or broken-line shaped or wavy) second raised part has a varying width; however, the configuration of the second raised part 15B is not limited thereto. For example, a plurality of convex parts 15*b*6 each having circular (or polygonal) planar shape may be disposed as the second raised part 15B, as in the present modification example.

Specifically, the plurality of convex parts 15*b*6 are disposed to have a larger diameter as being closer to the light sources 11 (as the distance from the light sources 11 becomes smaller). Alternatively, the plurality of convex parts 15*b*6 are disposed to have larger disposition density as being closer to the light sources 11, as illustrated in FIG. 14B.

In the present modification example as well, by varying the size of each planar shape of or disposition density of the circular convex parts 15*b*6 that configure the second raised part 15B, it becomes possible to vary the adhesion area depending on the distance from the light sources 11, thus allowing for achievement of effects similar to those of the foregoing Modification Example 2.

Modification Example 4

FIG. 15 illustrates a planar configuration of the light-guide plate 13 (the second surface S2) and the light sources 11 according to Modification Example 4. The foregoing first embodiment exemplifies the configuration in which, in the effective display region A1, the size (diameter) of each planar shape of the first convex parts 15*a*1 varies depending on the distance from the light sources 11. However, in a dot pattern 15E, a plurality of first convex parts 15*e*1 may have the same diameter, and disposition density thereof may be different, as in the present modification example. Specifically, the dot pattern 15E of the effective display region A1 has a configuration in which the disposition density of the plurality of first convex parts 15*e*1 becomes smaller as being closer to the light sources 11, and becomes larger as being away from the light sources 11. The first raised part 15*e*1 includes a material having the light diffusion property and the adhesiveness, similarly to the first raised part 15*a*1 of the foregoing first embodiment.

In this configuration, a second raised part 15F provided in the peripheral region A2 may have a planar shape such as the linear shape as described above; however, the second raised part 15F may desirably include a plurality of convex parts 15*f*1 as in the present modification example. The plurality of convex parts 15*f*1 each desirably include the same material as that of the first raised part 15*e*1, and desirably have the same size (diameter). In the second raised part 15F, the plurality of convex parts 15*f*1 are disposed at least in a portion of the peripheral region A2, for example, in one or plurality of lines (two lines in this example) depending on size of the diameter thereof. In the example illustrated in FIG. 15, the plurality of convex parts 15*f*1 are densely disposed along regions corresponding to three sides of the planar shape of the second surface S2. Although illustration is not particularly given, the second raised part may not be disposed or may be disposed in the region corresponding to another side (a region in proximity to the light sources 11). In the latter case, it is desirable that the second parts 15C be disposed in the selective region as illustrated in FIG. 10.

In the present modification example, the disposition of the second raised part 15F in the peripheral region A2 allows for increase in the adhesion area while reducing the stress applied to the first convex parts 15*e*1 disposed in the effective display region A1. This allows for suppression in the detachment of the light-guide plate 13 and the reflective sheet 14 (unillustrated in FIG. 13A) from each other. Hence, it becomes possible to achieve effects similar to those of the foregoing first embodiment.

Further, the convex parts 15*f*1 in the second raised part 15F each include the same material and have the same size as those of each of the first convex parts 15*e*1 that are disposed in the effective display region A1. This brings effects as described below.

That is, for example, as illustrated in FIG. 16, the plurality of convex parts 15*f*1 and a second raised part 105B including a material and having a size that are different from those of the first raised part 15*e*1 are formed by means of printing, etc., respectively, in the effective display region A1 and the peripheral region A2. In this case, a height h1 of the first raised part 15*e*1 and a height h2 of the second raised part 105B may be sometimes different. For example, even when the second raised part 105B and the first raised part 15*e*1 include the same material, in a case where the sizes (diameters or widths d1 and d2) are different (d1<d2), the height h2 of the second raised part 105B is larger than the height h1 of the first raised part 15*e*1 (h1<h2). As a result, close contact between the light-guide plate 13 and the reflective sheet 14 is lowered locally, thus impairing the optical characteristics. In contrast, in the present modification example, the convex parts 15*f*1 disposed in the peripheral region A2 each include the same material and have the same size as those of each of the first convex parts 15*e*1 that are disposed in the effective display region A1. This allows the height of the raised part 15*f*1 to be equal to the height h1 of the first raised part 15*e*1, as illustrated in FIG. 17. This allows for enhancement of the close contact between the light-guide plate 13 and the reflective sheet 14, thus making it possible to prevent lowering of the optical characteristics.

Second Embodiment

FIG. 18 illustrates a planar configuration (a configuration of the second surface S2) of the light-guide plate (a light-guide plate 13A) and a configuration of the light sources 11 according to a second embodiment of the disclosure. The light-guide plate 13A according to the present embodiment configures the illuminating section 10 in such a state that the light-guide plate 13A is adhered to (integrated with) the reflective sheet 14 similarly to the light-guide plate 13 according to the foregoing first embodiment; the light-guide plate 13A is used for the display apparatus 1. Further, the light sources 11 are disposed to face the end surface S3 of the light-guide plate 13A. A planar shape of the light-guide plate 13A in the second surface S2 thereof is rectangular. A constituent material similar to that of the light-guide plate 13 of the foregoing first embodiment may be used for the light-guide plate 13A.

In the light-guide plate 13A of the present embodiment, however, a plurality of types of convex parts (two types of convex parts 15*h*1 and 15*h*2 in this example) are disposed that have different diffusivities inside the effective display region A1 of the second surface S2. Specifically, the raised part 15*h*1 (a third raised part) includes a material having larger diffusivity, and the raised part 15*h*2 (a fourth raised part) includes a material having smaller diffusivity. The diffusivity of the raised part 15*h*1 is larger than the diffusivity of the raised part 15*h*2. A constituent material similar to that described for the first raised part 15*a*1 of the foregoing first embodiment may be used for each of the convex parts 15*h*1 and 15*h*2. However, a material having a light diffusion property and adhesiveness may be desirably used for the raised part 15*h*1, whereas a material for the raised part 15*h*2 may not necessarily have the light diffusion property insofar as the material has the adhesiveness.

A plurality of convex parts 15*h*1 are disposed inside the effective display region A1. As illustrated in FIG. 19A, the plurality of convex parts 15*h*1 have a configuration in which the size of each planar shape of or disposition density of the convex parts 15*h*1 becomes larger as being away from the light sources 11 (as the distance from the light sources 11 becomes larger). In this example, the planar shape of the raised part 15*h*1 is circular, and the diameter thereof becomes larger as being away from the light sources 11.

A plurality of convex parts 15*h*2 are disposed inside the effective display region A1. As illustrated in FIG. 19B, the plurality of convex parts 15*h*2 have a configuration in which the size of each planar shape of or disposition density of the convex parts 15*h*2 becomes smaller as being away from the light sources 11 (as the distance from the light sources 11 becomes larger). In this example, the planar shape of the raised part 15*h*2 is circular, and the diameter thereof becomes smaller as being away from the light sources 11.

The diffusivity of each of the convex parts 15*h*1 and 15*h*2 may be adjusted, for example, by varying a size and a concentration, etc. of particles of silica and titanium, etc. included in each of the convex parts 15*h*1 and 15*h*2.

In this manner, in the present embodiment, the reflective sheet 14 (unillustrated in FIG. 18) is adhered to side of the second surface S2 of the light-guide plate 13A, with the plurality of convex parts 15*h*1 and the plurality of convex parts 15*h*2 both having the light diffusion property being interposed therebetween. The plurality of convex parts 15*h*1 and the plurality of convex parts 15*h*2 allow light propagating inside the light-guide plate 13A to be diffused and outputted from the first surface S1 (unillustrated in FIG. 18) of the light-guide plate 13A. Among these, the raised part 15*h*1 has larger diffusivity than the diffusivity of the raised part 15*h*2. The plurality of convex parts 15*h*1 has a configuration in which the size of each planar shape of or disposition density thereof becomes smaller as being away from the light sources 11. The plurality of convex parts 15*h*2 has a configuration in which the size of each planar shape of or disposition density thereof becomes larger as being away from the light sources 11.

This enables the entire effective display region A1 including the convex parts 15*h*1 and 15*h*2 to increase the adhesion area while retaining a tendency of reinforcing the diffusion property as being away from the light sources 11. Hence, it becomes possible to secure the adhesion area while maintaining a luminance distribution of light outputted from the first surface S1 of the light-guide plate 13A. This makes it possible to achieve effects similar to those of the foregoing first embodiment.

Modification Example 5

FIG. 20 and FIG. 21 each illustrate an appearance of a desktop lighting apparatus to which the illuminating section 10 according to the foregoing first embodiment, etc. is applied. The illuminating section 10 is applicable to the lighting apparatus as in the present modification example, other than the above-described display apparatus 1. For example, the lighting apparatus includes a lighting section 843 that is attached to a supporting post 842 provided on a base mount 841, and the lighting section 843 is configured by, for example, the illuminating section 10 according to the foregoing first embodiment. Forming the light-guide plate 13 or the reflective sheet 14, etc. in a curved shape allows the lighting section 843 to take any form, such as a cylindrical shape illustrated in FIG. 20 or a curved shape illustrated in FIG. 21.

FIG. 22 illustrates an appearance of an indoor lighting apparatus to which the illuminating section 10 of the foregoing first embodiment, etc. is applied. The illuminating section 10 is applicable to the lighting apparatus as in the present modification example, other than the above-described display apparatus 1. For example, the lighting apparatus includes lighting sections 844 each of which is configured by the illuminating section 10 according to the foregoing first embodiment. The appropriate number of the lighting sections 844 are disposed at an appropriate interval on a ceiling 850A of a building. It is to be noted that installation locations of the lighting sections 844 are not limited to the ceiling 850A, but the lighting sections 844 may be installed at any location such as a wall 850B or a floor (unillustrated) depending on the intended use.

Although the description has been given hereinabove with reference to the embodiments, the disclosure is not limited to the foregoing embodiments, etc., but may be modified in a variety of ways. For example, the foregoing embodiments, etc. exemplify the configuration in which the light-guide plate 13 and the reflective sheet 14 are adhered, with the convex parts (the first convex parts and the second raised part) having adhesiveness being interposed therebetween; however, the convex parts may not necessarily have the adhesiveness.

For example, as illustrated in FIG. 23A, a plurality of convex parts 15*g*1 may be formed through processing of the side of the second surface S2 of the light-guide plate 13 by means of a laser, etc., for example. In other words, the convex parts 15*g*1 may be a portion of the light-guide plate 13. In this case, a thin adhesive layer 151 is formed on a surface, of the reflective sheet 14, on side of the light-guide plate 13; the adhesive layer 151 allows the light-guide plate 13 and the reflective sheet 14 to be adhered together. A region between the convex parts 15*g*1 serves as the air layer 150, thus preventing lowering of the optical characteristics, similarly to the foregoing embodiments.

Further, the side of the second surface S2 of the light-guide plate 13 may take various shapes through processing. For example, convex parts 15*g*2 each having a trapezoid cross-sectional shape may be formed as illustrated in FIG. 23B. In this case, a region (a triangular cross-sectional recessed part) between the convex parts 15*g*2 serves as the air layer 150.

Furthermore, although the foregoing embodiments, etc. exemplify the case where the first raised part and the second raised part each include a material having adhesiveness, the first raised part and the second raised part may not necessarily have the adhesiveness. In this case, for example, the adhesive layer 151 is formed between the first convex parts as well as the second raised part (only the first convex parts 15*a*1 are illustrated in this example) and the reflective sheet 14, as illustrated in FIG. 24.

Moreover, although the foregoing embodiments, etc. exemplify the liquid crystal display apparatus as the display apparatus 1, the disclosure may also be applied to a plasma display apparatus or an organic electroluminescent display apparatus.

In addition, each of the components described in the foregoing embodiments is merely illustrative. Some of the components may be omitted, or any other components may be further provided.

It is to be noted that the effects described in the present specification are merely exemplified and non-limiting, and there may be other effects.

Further, the disclosure may have the following configurations.

(1) An illuminating unit including:

a plurality of light sources;

a light-guide plate including an end surface disposed to face the plurality of light sources, a first surface that outputs light which is based on incident light from the end surface, and a second surface that faces the first surface and includes a plurality of convex parts; and an optical sheet adhered to side of the second surface of the light-guide plate, with the plurality of convex parts being interposed therebetween, in which the plurality of convex parts include a plurality of first convex parts disposed in a first region inside the second surface, and one or plurality of second convex parts disposed in at least a portion of a second region on a periphery of the first region inside the second surface.

(2) The illuminating unit according to (1), in which a size of a planar shape of or disposition density of the one or plurality of second convex parts in the second surface varies depending on a distance from the light sources.

(3) The illuminating unit according to (2), in which the planar shape of the one or plurality of second convex parts is linear, broken-line shaped, or wavy in at least the portion of the second region of the light-guide plate, and a width of the planar shape becomes larger as being closer to the light sources.

(4) The illuminating unit according to (2), in which the plurality of second convex parts are provided, each planar shape of the plurality of second convex parts in the second surface is circular or polygonal, and a diameter of each planar shape of or the disposition density of the plurality of second convex parts becomes larger as being closer to the light sources.

(5) The illuminating unit according to any one of (1) to (4), in which the one or plurality of second convex parts are disposed in the second region to surround the first region.

(6) The illuminating unit according to any one of (1) to (5), in which the plurality of second convex parts are provided, the second raised part, of the plurality of second convex parts, disposed in a region distant from the light sources is disposed to surround the first region, and the second raised part, of the plurality of second convex parts, disposed in a region in proximity to the light sources is disposed in a selective region depending on a position of the light sources.

(7) The illuminating unit according to any one of (1) to (6), in which each of the first convex parts and each of the one or plurality of second convex parts include a same material as each other.

(8) The illuminating unit according to (7), in which the plurality of second convex parts are provided, a planar shape of each of the first convex parts and the second convex parts in the second surface is circular or polygonal, and a diameter of the planar shape of each of the first convex parts and the diameter of the planar shape of each of the second convex parts are same as each other.

(9) The illuminating unit according to any one of (1) to (8), in which the plurality of first convex parts include a plurality of third convex parts and a plurality of fourth convex parts, the third convex parts and the fourth convex parts having diffusivities that are different from each other, the diffusivity of each of the third convex parts is larger than the diffusivity of each of the fourth convex parts, a size of a planar shape of or disposition density of the plurality of third convex parts in the second surface becomes larger as being away from the light sources, and a size of a planar shape of or disposition density of the plurality of fourth convex parts in the second surface becomes smaller as being away from the light sources.

(10) The illuminating unit according to (9), in which each planar shape of the third convex parts and the fourth convex parts in the second surface is circular or polygonal.

(11) The illuminating unit according to any one of (1) to (10), in which the first convex parts and the one or plurality of second convex parts each include an adhesive material that allows the light-guide plate and the optical sheet to be adhered together.

(12) The illuminating unit according to any one of (1) to (11), further including an adhesive layer provided between each of the first convex parts and the one or plurality of second convex parts and the optical sheet.

(13) An illuminating unit including:

a plurality of light sources;

a light-guide plate including an end surface disposed to face the plurality of light sources, a first surface that outputs light which is based on incident light from the end surface, and a second surface that faces the first surface and includes a plurality of convex parts; and an optical sheet adhered to side of the second surface of the light-guide plate, with the plurality of convex parts being interposed therebetween, in which the plurality of convex parts include a plurality of third convex parts and a plurality of fourth convex parts, the third convex parts and the fourth convex parts having diffusivities that are different from each other, the diffusivity of each of the third convex parts is larger than the diffusivity of each of the fourth convex parts, a size of a planar shape of or disposition density of the plurality of third convex parts in the second surface becomes larger as being away from the light sources, and a size of a planar shape of or disposition density of the plurality of fourth convex parts in the second surface becomes smaller as being away from the light sources.

(14) A display apparatus including:

a display panel; and an illuminating unit that illuminates the display panel, the illuminating unit including a plurality of light sources, a light-guide plate including an end surface disposed to face the plurality of light sources, a first surface that outputs light which is based on incident light from the end surface, and a second surface that faces the first surface and includes a plurality of convex parts, and an optical sheet adhered to side of the second surface of the light-guide plate, with the plurality of convex parts being interposed therebetween, in which the plurality of convex parts include a plurality of first convex parts disposed in a first region inside the second surface, and one or plurality of second convex parts disposed in at least a portion of a second region that is a peripheral region of the first region inside the second surface.

(15) A display apparatus including:

a display panel; and an illuminating unit that illuminates the display panel, the illuminating unit including a plurality of light sources, a light-guide plate including an end surface disposed to face the plurality of light sources, a first surface that outputs light which is based on incident light from the end surface, and a second surface that faces the first surface and includes a plurality of convex parts, and an optical sheet adhered to side of the second surface of the light-guide plate, with the plurality of convex parts being interposed therebetween, in which the plurality of convex parts include a plurality of third convex parts and a plurality of fourth convex parts, the third convex parts and the fourth convex parts having diffusivities that are different from each other, the diffusivity of each of the third convex parts is larger than the diffusivity of each of the fourth convex parts, a size of a planar shape of or disposition density of the plurality of third convex parts in the second surface becomes larger as being away from the light sources, and a size of a planar shape of or disposition density of the plurality of fourth convex parts in the second surface becomes smaller as being away from the light sources.

It should be understood by those skilled in the art that various modifications, combinations, sub-combinations, and alterations may occur depending on design requirements and other factors insofar as they are within the scope of the appended claims or the equivalents thereof.

The invention claimed is:

1. A display comprising:

a plurality of light sources; and a light-guide plate including an end surface disposed to face the plurality of light sources, a first surface that outputs light which is based on incident light from the end surface, and a second surface having a plurality of convex parts that faces the first surface, the convex parts protrude outward from the second surface, wherein the plurality of convex parts includes a wavy top surface;

wherein the light sources are positioned on one end surface of the light-guide plate;

wherein the convex parts are formed of a different material than the light-guiding plate in which there is a line of demarcation between the convex parts and the light-guiding plate at the second surface; and wherein groups of the convex parts are aligned along optical axes of the light sources and the groups of the convex parts are configured such that widths of the convex parts within each group become smaller as a function of distance from the corresponding lights along the optical axes.

2. The display according to claim 1, further comprising an optical sheet facing the second surface, wherein the optical sheet is a reflective sheet that has a diffusion property.

3. The display according to claim 2, wherein the convex parts have a circular shape.

4. The display according to claim 2, wherein the convex parts have adhesiveness.

5. The display according to claim 2, wherein the convex parts have a disposition density that varies depending on a distance from the light sources.

6. The display according to claim 2, further comprising an adhesive layer provided between each of the convex parts and the optical sheet.

7. The display according to claim 1, wherein the convex parts have a circular shape.

8. The display according to claim 7, wherein the one or plurality of convex parts have a layout that is different than a layout of others of the plurality of convex parts.

9. The display according to claim 1, wherein the convex parts are configured to have a cavity therebetween to support and air layer.

10. The display according to claim 1, wherein the one or plurality of convex parts have a layout that is different than a layout of others of the plurality of convex parts.

11. The display according to claim 1, wherein the convex parts have adhesiveness.

12. The display according to claim 1, wherein the convex parts have a disposition density that varies depending on a distance from the light sources.

13. The display according to claim 12, wherein a planar size of the convex parts increases as a function of distance from the light sources.

14. The display according to claim 1, wherein the convex parts have particles dispersed therein.

15. The display according to claim 1, further comprising an adhesive layer provided between each of the convex parts and an optical sheet disposed on the second surface.

16. The display according to claim 15, wherein the optical sheet is a reflective sheet.

17. The display according to claim 1, further comprising an optical sheet facing the second surface, wherein the optical sheet is a reflective sheet.

* * * * *